(12) United States Patent
Ling et al.

(10) Patent No.: US 12,014,311 B2
(45) Date of Patent: Jun. 18, 2024

(54) ABNORMAL PATH ANALYSIS METHOD AND APPARATUS, AND ELECTRONIC DEVICE

(71) Applicant: CAINIAO SMART LOGISTICS HOLDING LIMITED, Grand Cayman (KY)

(72) Inventors: Yu Ling, Hangzhou (CN); Xiongbin Wu, Hangzhou (CN); Wenju Wang, Hangzhou (CN)

(73) Assignee: CAINIAO SMART LOGISTICS HOLDING LIMITED, Grand Cayman (KY)

( * ) Notice: Subject to any disclaimer, the term of this patent is extended or adjusted under 35 U.S.C. 154(b) by 518 days.

(21) Appl. No.: 17/188,840

(22) Filed: Mar. 1, 2021

(65) Prior Publication Data

US 2021/0192662 A1  Jun. 24, 2021

Related U.S. Application Data

(63) Continuation of application No. PCT/CN2019/103245, filed on Aug. 29, 2019.

(30) Foreign Application Priority Data

Sep. 3, 2018  (CN) .......................... 201811020767.5

(51) Int. Cl.
*G06Q 10/08* (2023.01)
*G01C 21/34* (2006.01)
(Continued)

(52) U.S. Cl.
CPC .......... *G06Q 10/08* (2013.01); *G01C 21/3415* (2013.01); *G06F 16/2462* (2019.01); *G06Q 10/047* (2013.01); *G06Q 30/018* (2013.01)

(58) Field of Classification Search
CPC ...................................................... G06Q 50/28
See application file for complete search history.

(56) References Cited

U.S. PATENT DOCUMENTS 6,211,781 B1   4/2001  McDonald
10,222,798 B1  3/2019  Brady et al.
(Continued)

FOREIGN PATENT DOCUMENTS

CN   104267711 A   1/2015
CN   105180919 A   12/2015
(Continued)

OTHER PUBLICATIONS

Google Machine Translation of Chinese Patent Application Pub. No. CN107894757A.*
(Continued)

*Primary Examiner* — Jean Paul Cass

(57) ABSTRACT

An abnormal path analysis method and apparatus, and an electronic device are provided. The method comprises: obtaining data of an actual fulfillment path of a logistics object, wherein the actual fulfillment path comprises one or more routes connecting a plurality of fulfillment centers on the actual fulfillment path; obtaining data of a standard planned path corresponding to the logistics object, wherein the standard planned path comprises one or more routes connecting a plurality of fulfillment centers on the standard planned path; comparing the data of the actual fulfillment path with the data of the standard planned path to generate route comparison results; and obtaining detailed mis-distribution data of the logistics object according to the route comparison results.

17 Claims, 9 Drawing Sheets

(51) Int. Cl.
　　　*G06F 16/2458*　　(2019.01)
　　　*G06Q 10/047*　　(2023.01)
　　　*G06Q 30/018*　　(2023.01)

(56)　　　　　References Cited

U.S. PATENT DOCUMENTS

| | | |
|---|---|---|
| 10,241,516 B1 | 3/2019 | Brady et al. |
| 10,245,993 B1 | 4/2019 | Brady et al. |
| 10,303,171 B1 | 5/2019 | Brady et al. |
| 10,346,793 B2 | 7/2019 | Agarwal et al. |
| 10,359,783 B2 | 7/2019 | Williams et al. |
| 10,380,534 B2 | 8/2019 | Khasis |
| 10,445,818 B1 | 10/2019 | Chowdhary |
| 10,783,462 B1 | 9/2020 | Mo et al. |
| 10,866,952 B2 | 12/2020 | Nixon et al. |
| 11,534,015 B2 * | 12/2022 | Janas .................. A47G 29/141 |
| 11,583,122 B2 * | 2/2023 | Rogers ............... A47G 29/1251 |
| 11,592,846 B1 * | 2/2023 | Wiegman ............. G08G 5/0039 |
| 11,641,966 B2 * | 5/2023 | Nakanishi ............ A47G 29/141 232/44 |
| 2004/0177008 A1 | 9/2004 | Yang |
| 2007/0150375 A1 | 6/2007 | Yang |
| 2018/0080782 A1 * | 3/2018 | Noda ................. G01C 21/3461 |
| 2019/0161190 A1 * | 5/2019 | Gil ......................... B64U 10/16 |
| 2019/0251505 A1 * | 8/2019 | Simms ............... G06Q 30/0633 |
| 2020/0039747 A1 | 2/2020 | Ahmann et al. |
| 2020/0288895 A1 * | 9/2020 | Bennet ................. H04W 12/03 |
| 2021/0149382 A1 | 5/2021 | Stadie et al. |
| 2022/0223056 A1 * | 7/2022 | Dupray ............... G08G 5/0013 |

FOREIGN PATENT DOCUMENTS

| | | | |
|---|---|---|---|
| CN | 106331516 A | | 1/2017 |
| CN | 107038884 A | | 8/2017 |
| CN | 107894757 A | * | 4/2018 |
| CN | 107894757 A | | 4/2018 |
| CN | 108460549 A | | 8/2018 |
| CN | 110062740 A | | 7/2019 |
| DE | 102016119178 A1 | | 4/2017 |
| JP | 2002-096913 A | | 4/2002 |
| JP | 2019-530625 A | | 10/2019 |
| KR | 10-2021-0013363 A | | 2/2021 |
| WO | 2016158800 A1 | | 10/2016 |

OTHER PUBLICATIONS

PCT International Search Report and the Written Opinion dated Nov. 27, 2019, issued in related International Application No. PCT/CN2019/103245, with partial English translation (9 pages).
PCT International Preliminary Report on Patentability dated Mar. 18, 2021, issued in related International Application No. PCT/CN2019/103245, with English translation (9 pages).
Notice of Reasons for Rejection dated Jun. 28, 2022, issued in related Japanese Application No. 2021-512252, with English machine translation (6 pages).
First Search for Chinese Application No. 201811020767.5 dated Feb. 23, 2023.
Deng, "In the process of logistics and transportation based on the Internet of Things Design of abnormal alarm function," Engineering and Technology, May 15, 2013, English abstract provided.

\* cited by examiner

ABNORMAL PATH ANALYSIS METHOD AND APPARATUS, AND ELECTRONIC DEVICE

CROSS-REFERENCE TO RELATED APPLICATIONS

This application is a continuation application of International Patent Application No. PCT/CN2019/103245, filed with the China National Intellectual Property Administration (CNIPA) on Aug. 29, 2019, which is based on and claims priority to and benefits of Chinese Patent Application No. 201811020767.5, filed on Sep. 3, 2018 and entitled "ABNORMAL LINE ANALYSIS METHOD AND APPARATUS, AND ELECTRONIC DEVICE." The entire contents of the above-identified applications are incorporated herein by reference.

TECHNICAL FIELD

The specification relates to the field of computer technologies, and in particular, to an abnormal path analysis method and apparatus, and an electronic device.

BACKGROUND

In abnormal path analysis of a trunk network of an express company, quick, accurate, and comprehensive detection and subsequent publication and improvement of an abnormal path are of great value for the express company, in terms of time efficiency cost optimization of the trunk network and operation and management of each network node.

Existing technologies measure whether the actual path is abnormal by comparing a fulfillment time efficiency of an actual path with a standard time efficiency. If the fulfillment time efficiency of the actual path exceeds the standard time efficiency by a threshold, the path is determined to be an abnormal path.

The existing technologies have the following disadvantages:
1. Criteria for time efficiency are not comprehensive enough. For many abnormal (mis-sorting or mis-distribution) paths, it is possible that although the fulfillment time efficiency of the actual path reaches the standard time efficiency, the transit center is not appropriate and the mileage is longer than a standard path.
2. Time efficiency determination is performed only after an actual path fulfillment process of a vehicle is completed, making it impossible to monitor the vehicle on the path in real time and make a determination in advance.

SUMMARY

The specification provides an abnormal path analysis method and apparatus, and an electronic device, which can accurately evaluate an abnormal path in an express network, and can monitor and pre-determine an abnormality of an actual fulfillment path of an express vehicle on a path in real time.

To achieve the foregoing objectives, the following technical solutions are used in embodiments of the specification.

According to a first aspect, an abnormal path analysis method is provided, including:
obtaining data of an actual fulfillment path of a logistics object;
obtaining data of a standard planned path corresponding to the logistics object; and
comparing the data of the actual fulfillment path of the logistics object with the data of the standard planned path to obtain detailed mis-distribution data of the logistics object.

In an embodiment, an abnormal path analysis method is provided. The method comprises: obtaining data of an actual fulfillment path of a logistics object, wherein the actual fulfillment path comprises one or more routes connecting a plurality of fulfillment centers on the actual fulfillment path; obtaining data of a standard planned path corresponding to the logistics object, wherein the standard planned path comprises one or more routes connecting a plurality of fulfillment centers on the standard planned path; comparing the data of the actual fulfillment path with the data of the standard planned path to generate route comparison results; and obtaining detailed mis-distribution data of the logistics object according to the route comparison results.

In an embodiment, comparing the data of the actual fulfillment path with the data of the standard planned path to generate route comparison results comprises: setting an originating center of the logistics object as a current fulfillment center; and executing one or more iterations of step (1) and step (2). In step (1), comparing a route of the actual fulfillment path from the current fulfillment center to a next fulfillment center with a route of the standard planned path from the current fulfillment center to another fulfillment center to obtain a route comparison result and to determine whether the route of the actual fulfillment path is different from the route of the standard planned path; and if the route of the actual fulfillment path is different from the route of the standard planned path, marking the current fulfillment center as a mis-distribution center, re-obtaining data of the standard planned path using the next fulfillment center in the actual fulfillment path as the originating center of the standard planned path, and proceeding to the step (2), or if the route of the actual fulfillment path is not different from the route of the standard planned path, proceeding to the step (2). In step (2) setting the next fulfillment center in the actual fulfillment path as the current fulfillment center.

In an embodiment, the detailed mis-distribution data comprises: a tracking number of the logistics object, the originating center, a destination center, the actual fulfillment path, a mis-distribution center, a next fulfillment center following the mis-distribution center, and an operation time of the mis-distribution center.

In an embodiment, the method further comprises: collecting statistics on the detailed mis-distribution data using a distribution center as a dimension of statistics, to obtain data of an abnormal path with respect to a center dimension, the data of the abnormal path with respect to the center dimension comprising: a current distribution center, a mis-distribution operation date, a total mis-distribution quantity, a total operation quantity, and a mis-distribution ratio.

In an embodiment, the method further comprises: collecting statistics on the detailed mis-distribution data using the originating center as a dimension of statistics, to obtain data of an abnormal path with respect to a path dimension, the data of the abnormal path with respect to the path dimension comprising: an originating center, a destination center, an actual fulfillment path, a total mis-distribution quantity, a total path quantity, and a path mis-distribution ratio.

In an embodiment, the method further comprises: collecting statistics on the detailed mis-distribution data using a flow direction of a logistics object as a dimension of statistics, to obtain data of an abnormal path with respect to a flow direction dimension, the data of the abnormal path with respect to the flow direction dimension comprising: an originating center, a destination center, a mis-distribution order quantity, a total order quantity, and a flow direction mis-distribution ratio.

In an embodiment, the method further comprises: performing path optimization and path supplement on the data of the standard planned path using the detailed mis-distribution data.

According to a second aspect, an abnormal path analysis apparatus is provided, including:

an actual fulfillment path data obtaining module, configured to obtain data of an actual fulfillment path of a logistics object;

a standard planned path data obtaining module, configured to obtain data of a standard planned path corresponding to the logistics object; and a detailed mis-distribution data obtaining module, configured to compare the data of the actual fulfillment path of the logistics object with the data of the standard planned path to obtain detailed mis-distribution data of the logistics object.

According to a third aspect, an electronic device is provided, including:

a memory, configured to store a program; and a processor, coupled to the memory and configured to execute the program, the program including code instructions for performing the abnormal path analysis method according to the first aspect.

According to a fourth aspect, an abnormal path analysis system is provided. The system comprises a processor and a non-transitory computer-readable storage medium storing instructions executable by the processor to cause the system to perform operations. The operations comprise: obtaining data of an actual fulfillment path of a logistics object, wherein the actual fulfillment path comprises one or more routes connecting a plurality of fulfillment centers on the actual fulfillment path; obtaining data of a standard planned path corresponding to the logistics object, wherein the standard planned path comprises one or more routes connecting a plurality of fulfillment centers on the standard planned path; comparing the data of the actual fulfillment path with the data of the standard planned path to generate route comparison results; and obtaining detailed mis-distribution data of the logistics object according to the route comparison results.

According to a fifth aspect, a non-transitory computer-readable storage medium for an abnormal path analysis, configured with instructions executable by one or more processors to cause the one or more processors to perform operations. The operations comprise: obtaining data of an actual fulfillment path of a logistics object, wherein the actual fulfillment path comprises one or more routes connecting a plurality of fulfillment centers on the actual fulfillment path; obtaining data of a standard planned path corresponding to the logistics object, wherein the standard planned path comprises one or more routes connecting a plurality of fulfillment centers on the standard planned path; comparing the data of the actual fulfillment path with the data of the standard planned path to generate route comparison results; and obtaining detailed mis-distribution data of the logistics object according to the route comparison results.

According to the abnormal path analysis method and apparatus and the electronic device provided in the specification, the data of the actual fulfillment path of the logistics object is compared with the data of the standard planned path to obtain the detailed mis-distribution data of the logistics object, to accurately evaluate an abnormal path in an express network. In addition, the path data comparison process is not necessarily performed after the logistics object reaches a destination center, which can be performed as long as a part of the fulfillment path data in the actual fulfillment path is obtained. Therefore, an abnormality of an actual fulfillment path of an express vehicle on a path can be monitored and pre-determined in real time.

The foregoing description is merely an overview of the technical solutions of the specification. To understand the technical solutions of the specification more clearly, embodiments can be performed according to content of the specification. Moreover, to make the foregoing and other objectives, features, and advantages of the specification more comprehensible, specific embodiments of the specification are described below.

BRIEF DESCRIPTION OF THE DRAWINGS

Various other advantages and benefits will become clear to a person of ordinary skill in the art by reading the following detailed description of embodiments. The accompanying drawings are merely used for illustrating the embodiments and do not constitute a limitation on the specification. Throughout the accompanying drawings, the same reference numerals are used to represent the same components.

DETAILED DESCRIPTION

The following describes in detail embodiments of the specification with reference to the accompanying drawings.

Although the accompanying drawings show the embodiments of the specification, the embodiments may be implemented in various manners and is not limited by the embodiments described herein. Rather, these embodiments are provided, so that the specification is more thoroughly understood and the scope of the specification is completely conveyed to a person skilled in the art.

Interpretation of terms:

Trunk: A transportation path between first-tier distribution centers of an express company is referred to as a trunk.

Flow direction: A direction from an originating center to a destination center, for example, Beijing-Shanghai, on a trunk of an express company is referred to as a flow direction.

Route: In a specific fulfillment path of a logistics object, a route of the logistics object includes actual passed logistics nodes, for example, Beijing-Tianjin-Shanghai.

Existing technologies determine whether an actual fulfillment path is an abnormal path through a path fulfillment time efficiency, resulting in a disadvantage of a lower accuracy of an analysis result. This disadvantage is improved by the solution provided in the specification, whose core idea is to compare data of an actual fulfillment path of a logistics object with data of a standard planned path to obtain detailed mis-distribution data of the logistics object, to accurately evaluate an abnormal path in an express network.

Figure 1:
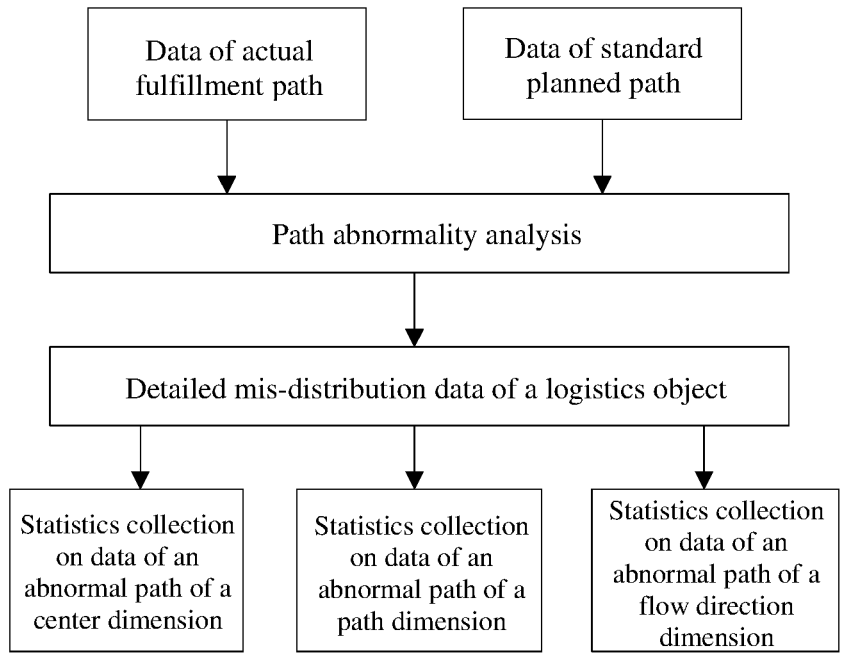
FIG. 1 is a schematic logical diagram of abnormal path analysis, according to an embodiment of the specification.

FIG. 1 is a schematic logical diagram of abnormal path analysis, according to an embodiment of the specification.

First, data of an actual fulfillment path of a logistics object is obtained, that is, relevant description data of a path on which a logistics object travels during a fulfilled transportation process is obtained. The actual fulfillment path comprises one or more routes connecting a plurality of fulfillment centers on the actual fulfillment path.

In addition, data of a standard planned path of the logistics object is obtained, that is, for each flow direction from an originating center to a destination center, an optimal path with a shorter distance and a shorter fulfillment time can be pre-planned manually or by a system as a standard planned path, and description data of the standard planned path is stored. the standard planned path comprises one or more routes connecting a plurality of fulfillment centers on the standard planned path.

Then, path abnormality analysis is performed on the data of the actual fulfillment path. The data of the actual fulfillment path of the logistics object is compared with the data of the standard planned path to obtain detailed mis-distribution data of the logistics object. The detailed mis-distribution data is data of mis-distribution in the actual fulfillment path in comparison with the data of the standard planned path.

Finally, statistics are collected on the detailed mis-distribution data of the logistics object in different dimensions, to obtain at least one type of the following statistical data: data of the abnormal path of a center dimension, data of the abnormal path of a path dimension, and data of the abnormal path of a flow direction dimension.

Figure 2:
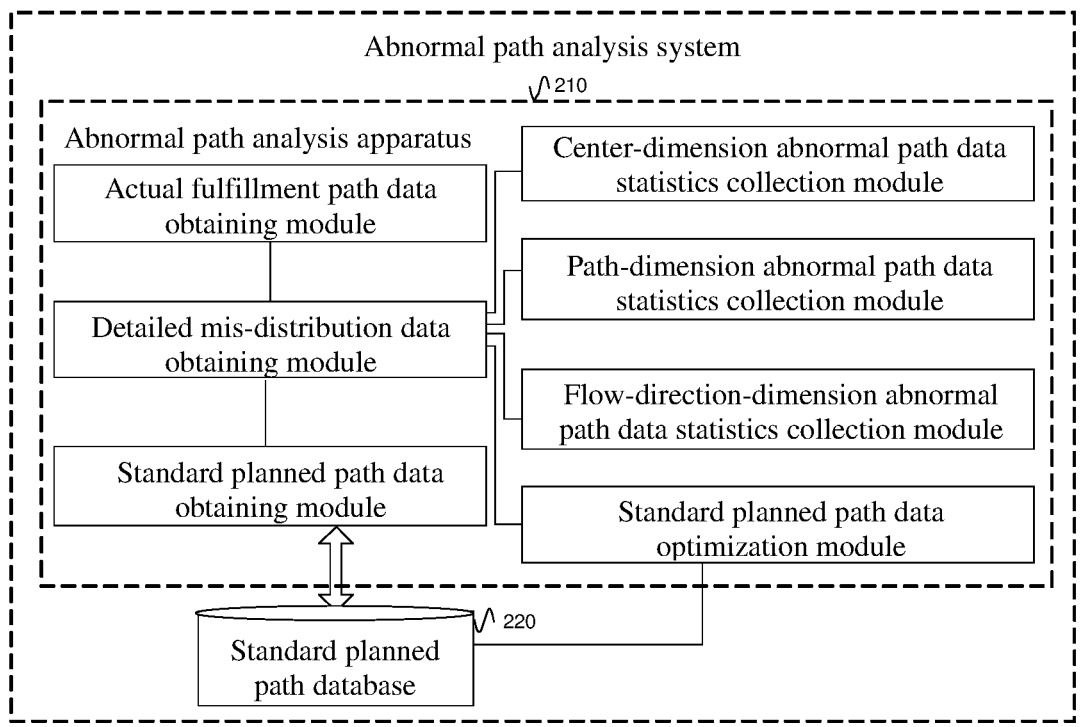
FIG. 2 is a schematic diagram of an abnormal path analysis system, according to an embodiment of the specification.

Based on the abnormal path analysis logic shown in FIG. 1, FIG. 2 is a schematic diagram of an abnormal path analysis system corresponding to the logic. The schematic diagram includes an abnormal path analysis apparatus 210 and a standard planned path database 220.

The abnormal path analysis apparatus 210 is configured to compare obtained data of an actual fulfillment path with pre-stored data of a standard planned path to obtain the detailed mis-distribution data of a logistics object. The standard planned path database 220 is configured to provide the abnormal path analysis apparatus 210 with data of a standard planned path for path comparison.

The abnormal path analysis apparatus 210 includes:
an actual fulfillment path data obtaining module, configured to obtain data of an actual fulfillment path of a logistics object;
a standard planned path data obtaining module, configured to obtain data of a standard planned path corresponding to the logistics object; and
a detailed mis-distribution data obtaining module, configured to compare the data of the actual fulfillment path of the logistics object with the data of the standard planned path to obtain detailed mis-distribution data of the logistics object.

The actual fulfillment path data obtaining module may obtain partial data of an actual fulfillment path of the logistics object in real time during a fulfilled transportation process, or may obtain complete data of an actual fulfillment path after an entire transportation process of the logistics object is completed. Meanwhile, the standard planned path data obtaining module obtains the data of the standard planned path corresponding to the logistics object according to a flow direction of the logistics object. The standard planned path can include a plurality of paths with the same flow direction but different routes. The detailed mis-distribution data obtaining module compares the data of the actual fulfillment path of the logistics object with the data of the standard planned path according to a sequence of generation of routes, to find a difference between the two, to form the detailed mis-distribution data of the logistics object.

Further, the comparing, by the detailed mis-distribution data obtaining module, the data of the actual fulfillment path of the logistics object with the data of the standard planned path to obtain detailed mis-distribution data of the logistics object may include the following steps:

step 1: using an originating center of the logistics object as an initial current fulfillment center;

step 2: comparing a route of the actual fulfillment path from a current fulfillment center to a next fulfillment center with a route of the standard planned path from the current fulfillment center to another fulfillment center, to determine whether the route of the actual fulfillment path is different from the route of the standard planned path;

step 3: marking the current fulfillment center as a mis-distribution center if the two compared routes are different, and re-obtaining data of the standard planned path for subsequent route comparison using the next fulfillment center in the actual fulfillment path as an originating center of a standard planned path;

step 4: using the next fulfillment center in the actual fulfillment path as a current fulfillment center;

repeating step 2 to step 4 until route comparison processes of all routes in the actual fulfillment path are completed to generate route comparison results; and obtaining the detailed mis-distribution data of the logistics object according to the routes comparison results.

Starting from the originating center of the logistics object, sequentially, a route of the actual fulfillment path from a current fulfillment center to a next fulfillment center can be compared with a route of the standard planned path from the current fulfillment center to another fulfillment center. Given that the current fulfillment centers (originating centers) in the two paths in the first comparison are the same, if routes are different, correspondingly, the next fulfillment center in the actual fulfillment path is different from the next fulfillment center in the standard planned path (i.e., the another fulfillment center), and mis-distribution (mis-sorting) occurs in the current fulfillment center in the actual fulfillment path. Therefore, the current fulfillment center is marked as a mis-distribution center. Using the next fulfillment center in the actual fulfillment path as an originating center of a standard planned path, data of a standard planned path is re-obtained for a subsequent route comparison.

After the next fulfillment center in the actual fulfillment path is set as a current fulfillment center, the foregoing path comparison process is performed again. In this case, because the originating center of the re-obtained standard planned path is the same as the current fulfillment center in the actual fulfillment path, the originating center of the standard planned path is also the current fulfillment center of the standard planned path. If the above two compared routes are the same, it is determined that no mis-distribution occurs in the current fulfillment center in the actual fulfillment path, and the next fulfillment center in the actual fulfillment path can be directly used as a current fulfillment center for further comparison with the next fulfillment center of the standard planned path (also used as a current fulfillment center of the standard planned path in this case). The foregoing two comparison processes are repeated for one or more iterations and all end when route comparison processes of all routes in the actual fulfillment path are completed.

Finally, the detailed mis-distribution data of the logistics object can be obtained by summarizing mis-distribution cases in all the route comparison processes.

Further, the detailed mis-distribution data may include: a tracking number of a logistics object, an originating center, a destination center, an actual fulfillment path, a mis-distribution center, a next fulfillment center of the mis-distribution center, and an operation time in the mis-distribution center.

Further, the abnormal path analysis apparatus 210 may further include: a center-dimension abnormal path data statistics collection module, configured to collect statistics on the detailed mis-distribution data using a distribution center as a dimension of statistics, to obtain data of the abnormal path with respect to a center dimension, the data of the abnormal path of the center dimension including: a current distribution center, a mis-distribution operation date, a total mis-distribution quantity, a total operation quantity, and a mis-distribution ratio.

Further, the abnormal path analysis apparatus 210 may further include: a path-dimension abnormal path data statistics collection module, configured to collect statistics on the detailed mis-distribution data using an originating center as a dimension of statistics, to obtain data of the abnormal path with respect to a path dimension, the data of the abnormal path of the path dimension including: an originating center, a destination center, an actual fulfillment path, a total mis-distribution quantity, a total path quantity, and a path mis-distribution ratio.

Further, the abnormal path analysis apparatus 210 may further include: a flow-direction-dimension abnormal path data statistics collection module, configured to collect statistics on the detailed mis-distribution data using a flow direction of a logistics object as a dimension of statistics, to obtain data of the abnormal path with respect to a flow direction dimension, the data of the abnormal path of the flow direction dimension including: an originating center, a destination center, a mis-distribution order quantity, a total order quantity, and a flow direction mis-distribution ratio.

After the detailed mis-distribution data of the logistics object is obtained, data statistics can be collected from different dimensions, such as the distribution center dimension, the path dimension, and the flow direction dimension, to obtain data of the abnormal path in the corresponding dimensions.

Further, the abnormal path analysis apparatus 210 may further include: a standard planned path data optimization module, configured to perform, using the detailed mis-distribution data, path optimization and path supplement on original data of a standard planned path provided by a courier.

After the detailed mis-distribution data of the logistics object is obtained, the data can be analyzed to find a better path to continuously supplement and optimize the original data of a standard planned path provided by the courier, to form more optimized data of a standard planned path.

The technical solution of the specification is further explained through the embodiments below.

Embodiment 1

Figure 3:
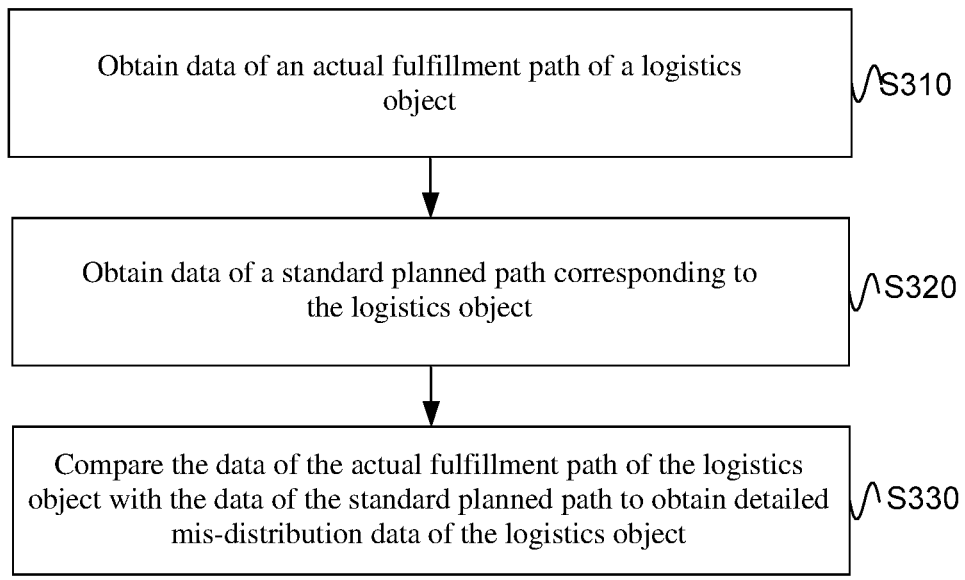
FIG. 3 is a first flowchart of an abnormal path analysis method, according to an embodiment of the specification.

Based on the foregoing abnormal path analysis idea, FIG. 3 is a first flowchart of an abnormal path analysis method, according to an embodiment of the specification. The method is performed by the abnormal path analysis apparatus 210 in FIG. 2. As shown in FIG. 3, the abnormal path analysis method includes the following steps:

S310: Obtain data of an actual fulfillment path of a logistics object.

The data of the actual fulfillment path of the logistics object is relevant description data of a path on which the logistics object travels during a fulfilled transportation process.

The obtaining process of data may be obtaining partial data of an actual fulfillment path of the logistics object in real time during a fulfilled transportation process, or obtaining complete data of an actual fulfillment path after an entire transportation process of the logistics object is completed (the logistics object has been signed off). The data of the actual fulfillment path may include the following key information: a tracking number of a logistics object, an originating center, a destination center, and an actual fulfillment path (specific to routes).

S320: Obtain data of a standard planned path corresponding to the logistics object.

For each flow direction from an originating center to a destination center, an optimal path with a shorter distance and a shorter fulfillment time can be pre-planned manually or by a system as a standard planned path, and description data of the standard planned path is stored.

After a flow direction of the logistics object is obtained, according to the flow direction, data of a standard planned path corresponding to the logistics object can be obtained in time from a preset standard planned path database. The data of the standard planned path may include the following key information: an originating center, a destination center, a planned path (each flow direction may correspond to a plurality of paths, for example, Beijing-Tianjin-Shanghai, and Beijing-Shanghai).

S330: Compare the data of the actual fulfillment path of the logistics object with the data of the standard planned path to obtain detailed mis-distribution data of the logistics object.

When path abnormality analysis is performed on the data of the actual fulfillment path, the data of the actual fulfillment path of the logistics object is compared with the data of the standard planned path according to a sequence of generation of routes, to find a difference between the two, to form the detailed mis-distribution data of the logistics object.

The detailed mis-distribution data is data of mis-distribution in the actual fulfillment path in comparison with the data of the standard planned path. The detailed mis-distribution data may include the following key information: a tracking number of a logistics object, an originating center, a destination center, an actual fulfillment path, a mis-distribution center, a next center of the mis-distribution center, and an operation time in the mis-distribution center.

Figure 4:
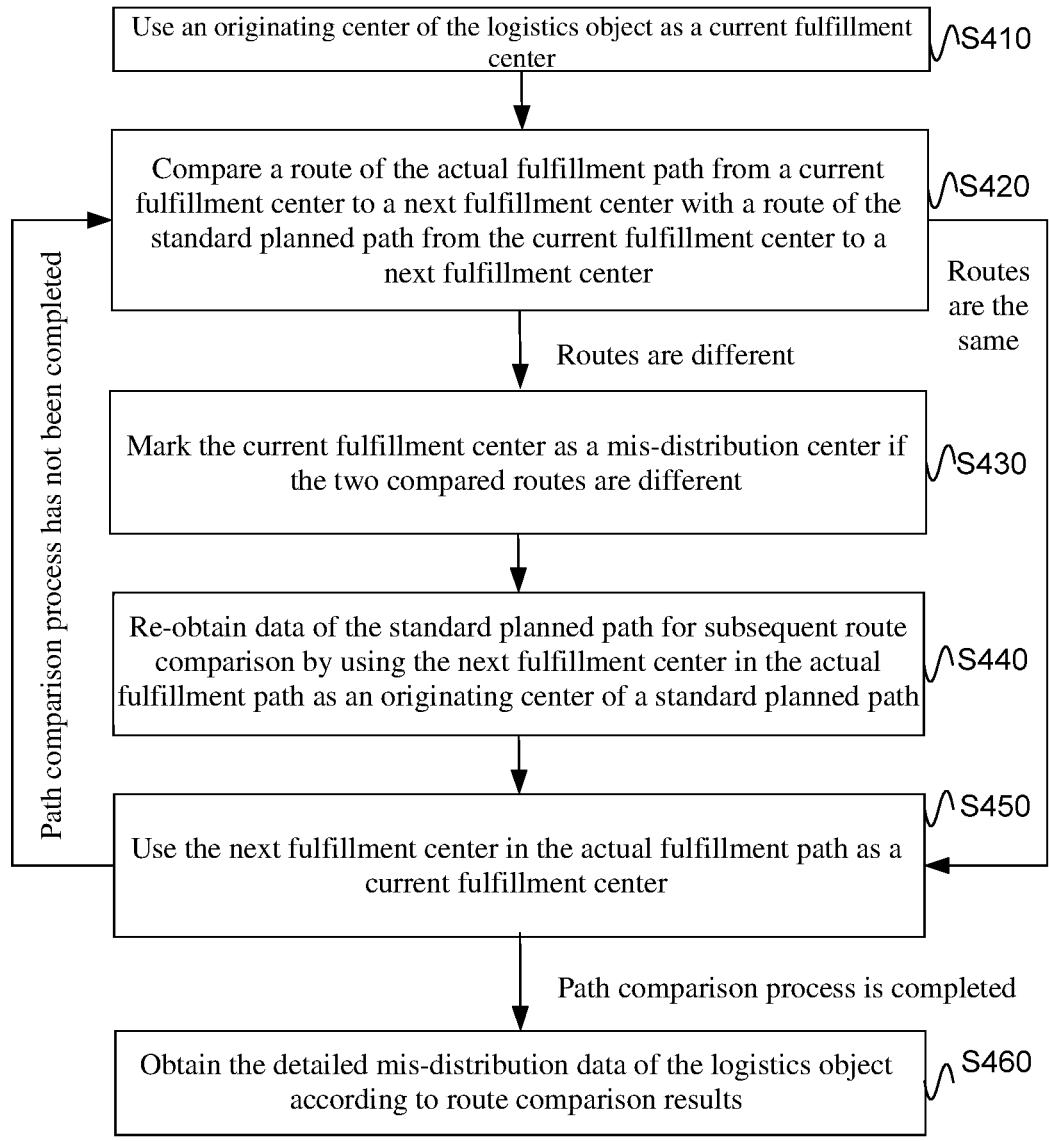
FIG. 4 is a second flowchart of an abnormal path analysis method, according to an embodiment of the specification.

Further, as shown in FIG. 4, this embodiment provides a detailed scheme of step S330. As shown in FIG. 4, the detailed scheme includes the following steps:

S410: Use an originating center of the logistics object as a current fulfillment center.

Starting from the originating center of the flow direction of the logistics object, the data of the actual fulfillment path of the logistics object is compared with the data of the standard planned path in an order of route extension, and the originating center is used as an initial current fulfillment center.

S420: Compare a route of the actual fulfillment path from a current fulfillment center to a next fulfillment center with a route of the standard planned path from the current fulfillment center to a next fulfillment center.

In the comparison process, the comparison can be performed in sequence according to a route formed by two adjacent fulfillment centers. First, an originating center of the actual fulfillment path is used as a current fulfillment center, and a route from the current fulfillment center to a next fulfillment center is compared with a route of the standard planned path from the current fulfillment center to a next fulfillment center in the standard planned path.

S430: Mark the current fulfillment center as a mis-distribution center if the two compared routes are different.

Given that in the first route comparison, the current fulfillment centers (originating centers) in the two compared paths are the same, if a comparison result is that the routes are different, the next fulfillment center in the actual fulfillment path is different from the next fulfillment center in the standard planned path, and mis-distribution (mis-sorting) occurs in the current fulfillment center in the actual fulfillment path. Therefore, the current fulfillment center is marked as a mis-distribution center.

S440: Re-obtain data of a standard planned path for subsequent route comparison using the next fulfillment center in the actual fulfillment path as an originating center of a standard planned path.

Because mis-distribution occurs in the fulfillment center in the actual fulfillment path, it is necessary to re-plan a path for the flow direction of the logistics object. A planned flow uses the next fulfillment center of the actual fulfillment path (an actual location of the logistics object) as an originating center and the unchanged destination center to re-obtain data of the standard planned path for subsequent route comparison.

S450: Use the next fulfillment center in the actual fulfillment path as a current fulfillment center.

Then step S420 to step S450 are repeated until route comparison processes of all routes in the actual fulfillment path are completed.

In this case, because the originating center of the re-obtained standard planned path is the same as the current fulfillment center in the actual fulfillment path, the originating center of the standard planned path is also a current fulfillment center of the standard planned path.

If the result of step S420 is that the two compared routes are the same, it is determined that no mis-distribution occurs in the current fulfillment center in the actual fulfillment path, and step S450 can be directly performed using the next fulfillment center in the actual fulfillment path as a current fulfillment center for further comparison with the next fulfillment center of the original standard planned path (also used as a current fulfillment center of the standard planned path in this case).

The foregoing two comparison processes all end when route comparison processes of all routes in the actual fulfillment path are completed.

S460: Obtain the detailed mis-distribution data of the logistics object according to path comparison results.

The detailed mis-distribution data of the logistics object is obtained by summarizing mis-distribution cases in all the path comparison processes.

The steps in FIG. 4 can be explained through the following example.

Data of a standard planned path is as follows:
  for an originating center A and a destination center C, a standard planned path is: A-C/A-B-C,
  for an originating center D and the destination center C, a standard planned path is: D-C/D-F-C, and
  for an originating center E and the destination center C, a standard planned path is: E-C.

Data of an actual fulfillment path is as follows:
  an actual fulfillment path of a logistics object is: A-D-E-C.

Path comparison logic is as follows:

The originating center A in the actual fulfillment path is used as an initial current fulfillment center. From A to C, a next planned center of A (a next fulfillment center in a standard planned path) is B/C, but an actual fulfillment center is D. Then the fulfillment center A is recorded as follows: One path error occurs, and a corresponding logistics object number is No1. In this case, an actual location of the logistics object is the fulfillment center D, and an analysis system uses the fulfillment center D as a current fulfillment center and uses the fulfillment center C as a destination center for further abnormal path analysis of the logistics object.

For the current fulfillment center D: from D-C, a next planned center of D is C/F, but an actual fulfillment center is E. Then the current fulfillment center D is recorded as follows: One path error occurs, and a corresponding logistics object number is No1. In this case, an actual location of the logistics object is the fulfillment center E, and the analysis system uses E as a current fulfillment center and uses the fulfillment center C as a destination center for further abnormal path analysis of the logistics object.

For the current fulfillment center E: from E to C, a next planned center of E is C, and the actual fulfillment center is also C. Therefore, no error occurs.

Finally, the entire flow direction A-C and the routes of A-D-E-C are each recorded as follows: One path error occurs, and a corresponding logistics object number is No1.

With the above processing logic for each logistics object, detailed mis-distribution data of a logistics object dimension can be obtained.

For the mis-distributed logistics object No1, in the above embodiment, given that mis-distribution occurs in a plurality of fulfillment centers (A and D), there are a plurality of mis-distribution records, in which a logistics object and a mis-distribution center are used as primary elements.

According to the abnormal path analysis method provided in the specification, the data of the actual fulfillment path of the logistics object is compared with the data of the standard planned path to obtain the detailed mis-distribution data of the logistics object, to accurately evaluate an abnormal path in an express network. In addition, the path data comparison process is not necessarily performed after the logistics object reaches a destination center, and it can be performed as long as part of the fulfillment path data in the actual fulfillment path is obtained. Therefore, an abnormality of an actual fulfillment path of an express delivery vehicle on a path can be monitored and pre-determined in real time.

Embodiment 2

Based on the abnormal path analysis method in the previous embodiment, this embodiment describes supplementary processing of the detailed mis-distribution data in the method. Statistics are collected on the detailed mis-distribution data in the logistics object dimension to obtain data of the abnormal path with respect to a plurality of dimensions.

Figure 5A:
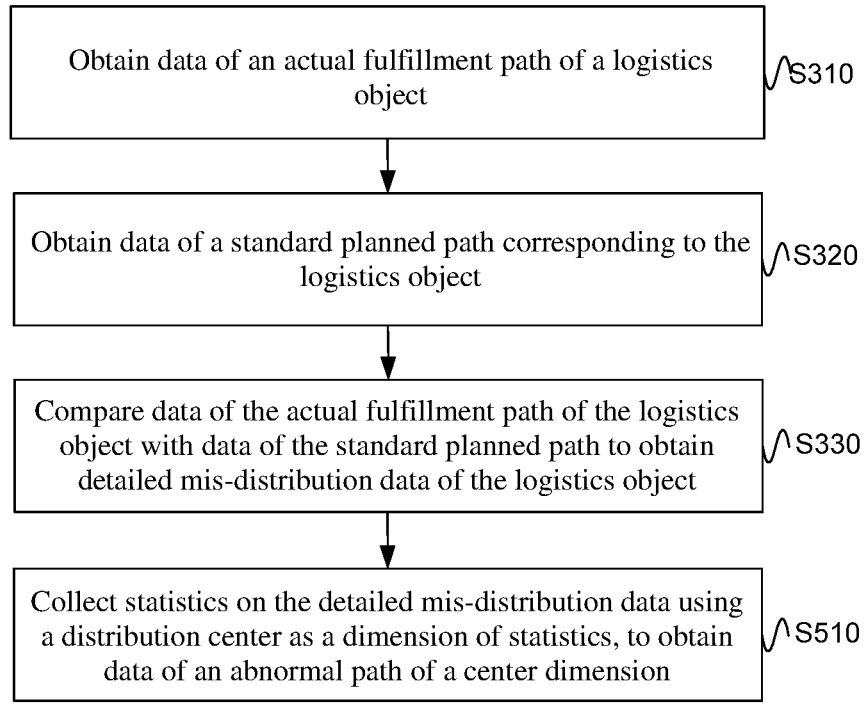
FIG. 5a is a third flowchart of an abnormal path analysis method, according to an embodiment of the specification.

FIG. 5a is a second flowchart of an abnormal path analysis method according to an embodiment of the specification. The flowchart includes the following step based on the method shown in FIG. 3.

S510: Collect statistics on the detailed mis-distribution data using a distribution center as a dimension of statistics, to obtain data of the abnormal path of a center dimension, the data of the abnormal path of the center dimension including: a current distribution center, a mis-distribution operation date, a total mis-distribution quantity, a total operation quantity, and a mis-distribution ratio.

Based on the detailed mis-distribution data of the logistics object, data of mis-distribution of each distribution center is summarized using a distribution center (i.e., an actual fulfillment center) as a dimension of statistics, to obtain data of the abnormal path of the center dimension of the each distribution center.

Figure 5B:
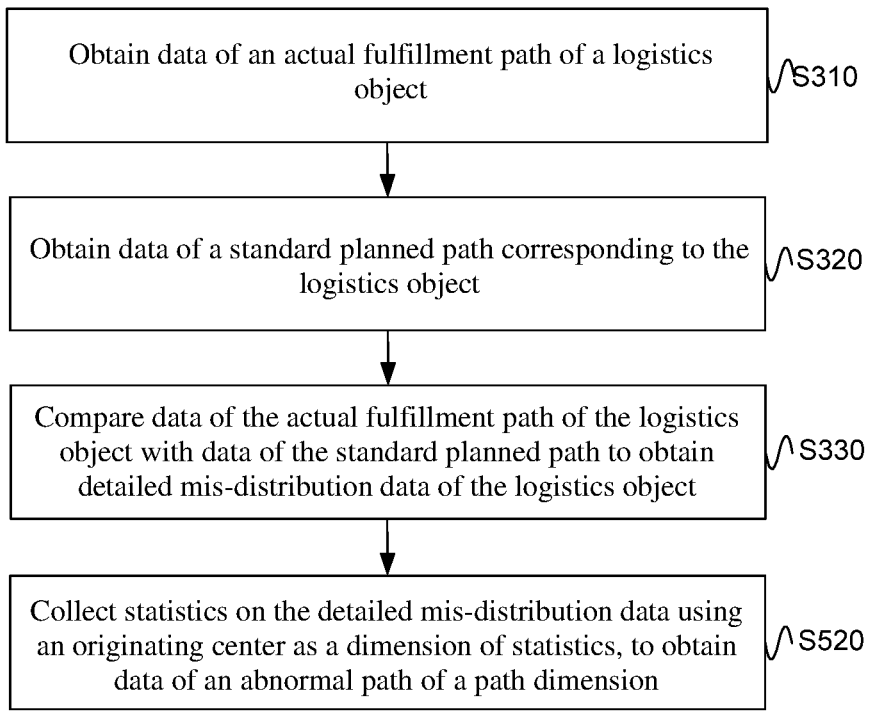
FIG. 5b is a fourth flowchart of an abnormal path analysis method, according to an embodiment of the specification.

In addition, FIG. 5b is a third flowchart of an abnormal path analysis method according to an embodiment of the specification. The flowchart includes the following step based on the method shown in FIG. 3.

S520: Collect statistics on the detailed mis-distribution data using an originating center as a dimension of statistics, to obtain data of the abnormal path with respect to a path dimension, the data of the abnormal path of the path dimension including: an originating center, a destination center, an actual fulfillment path, a total mis-distribution quantity, a total path quantity, and a path mis-distribution ratio.

Based on the detailed mis-distribution data of the logistics object, data of mis-distribution on each path starting from each originating center is summarized using an originating center (i.e., when an actual fulfillment center is the originating center) as a dimension of statistics, to obtain data of the abnormal path of the path dimension of the each originating center.

Figure 5C:
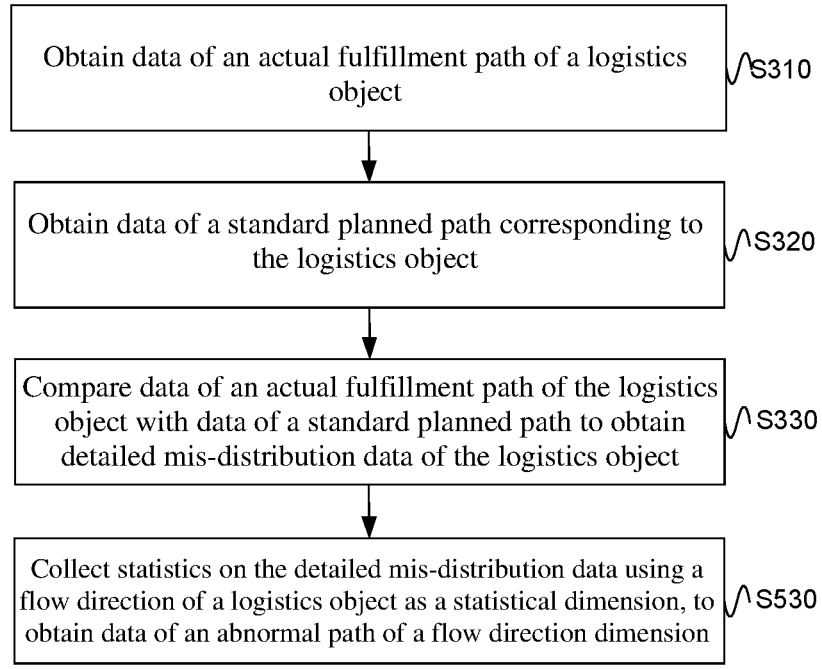
FIG. 5c is a fifth flowchart of an abnormal path analysis method, according to an embodiment of the specification.

In addition, FIG. 5c is a fourth flowchart of an abnormal path analysis method according to an embodiment of the specification. The flowchart includes the following step based on the method shown in FIG. 3.

S530: Collect statistics on the detailed mis-distribution data using a flow direction of a logistics object as a dimension of statistics, to obtain data of the abnormal path with respect to a flow direction dimension, the data of the abnormal path of the flow direction dimension including: an originating center, a destination center, a mis-distribution order quantity, a total order quantity, and a flow direction mis-distribution ratio.

Statistics are collected on the detailed mis-distribution data of the logistics object using the flow direction of the logistics object as a dimension of statistics. Each flow direction can correspond to a plurality of paths. Date of mis-distribution on each path in each flow direction is summarized to obtain data of the abnormal path of the flow direction dimension of the each flow direction.

In the above method steps of this embodiment, abnormal path statistics is performed on the detailed mis-distribution data of the logistics object in different dimensions of statistics, and the statistical results can clearly show statistical values of detailed mis-distribution of the logistics object.

Subsequently, the headquarters of an express company can check mis-distribution paths in each flow direction of an entire network, a quantity and proportion of logistics objects that are mis-distributed in each path, and a quantity and proportion of logistics objects that are mis-distributed in each center dimension. A distribution center of the express company can check a quantity and proportion of logistics objects that are mis-distributed to/from the distribution center in all paths, to investigate a cause of an abnormality.

Figure 6:
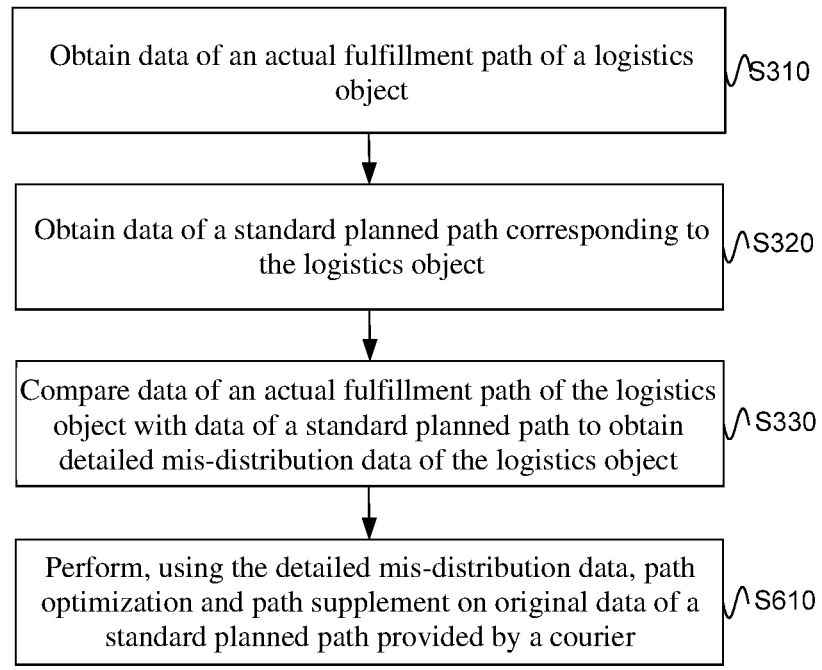
FIG. 6 is a sixth flowchart of an abnormal path analysis method, according to an embodiment of the specification.

In addition, in abnormal paths, some mis-distribution paths may actually be better paths. Therefore, as shown in FIG. 6, after step S330, step S610 can be performed, using the detailed mis-distribution data, path optimization and path supplement can be performed on original data of a standard planned path provided by a courier, so as to ensure a healthy increase of data in the standard planned path database.

According to the abnormal path analysis method provided in this embodiment of the specification, statistical values of abnormal paths in a plurality of dimensions are obtained by collecting statistics on detailed mis-distribution data of logistics objects in different dimensions. Based on the detailed mis-distribution data, a standard planned path of a logistics object can be calculated upon collection of the logistics object, and every time the logistics object arrives at a distribution center node, calculation can be performed according to obtained data of an actual fulfillment path to determine whether a path of the logistics object is abnormal, thereby achieving real-time processing.

In addition, the standard planned path database can be updated and maintained every day based on original data of a standard planned path provided by the express company and the statistical values of the abnormal paths in different dimensions, which ensures the accuracy and comprehensiveness of planning data so that an abnormal path is determined more accurately.

Embodiment 3

Figure 7:
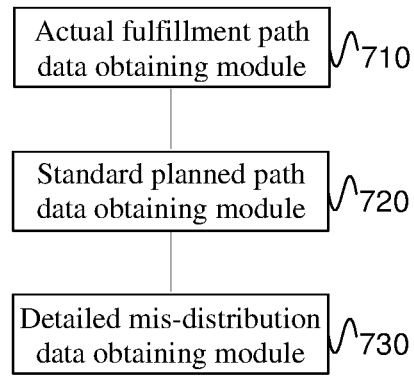
FIG. 7 is a first structural diagram of an abnormal path analysis apparatus, according to an embodiment of the specification.

FIG. 7 is a first structural diagram of an abnormal path analysis apparatus, according to an embodiment of the specification. The apparatus is configured to perform the method steps shown in FIG. 3. As shown in FIG. 7, the apparatus includes:

an actual fulfillment path data obtaining module 710, configured to obtain data of an actual fulfillment path of a logistics object;

a standard planned path data obtaining module 720, configured to obtain data of a standard planned path corresponding to the logistics object; and a detailed mis-distribution data obtaining module 730, configured to compare the data of the actual fulfillment path of the logistics object with the data of the standard planned path to obtain detailed mis-distribution data of the logistics object.

Figure 8:
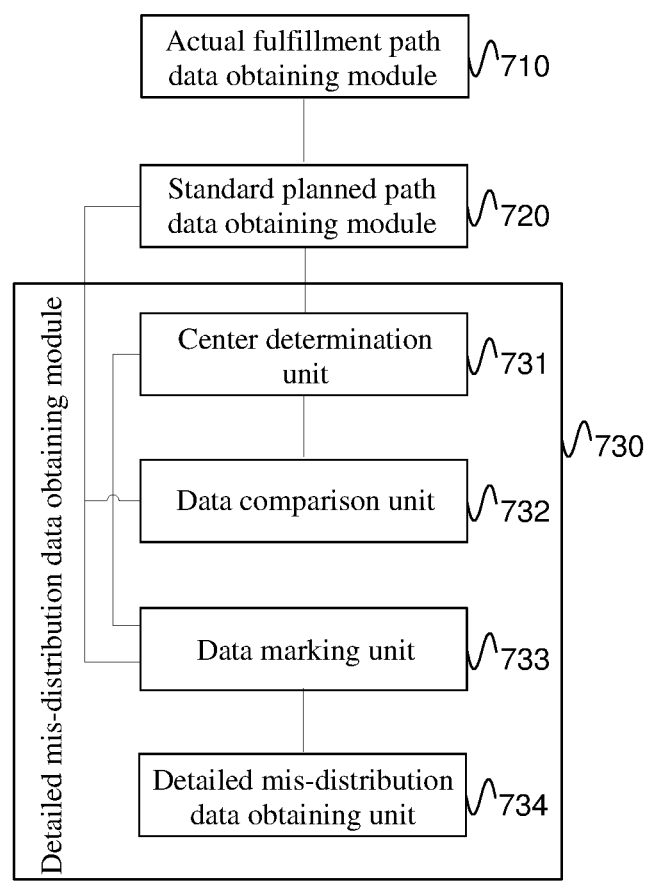
FIG. 8 is a second structural diagram of an abnormal path analysis apparatus, according to an embodiment of the specification.

Further, as shown in FIG. 8, the detailed mis-distribution data obtaining module 730 may include:

- a center determination unit 731, configured to use an originating center of the logistics object as an initial current fulfillment center;
- a data comparison unit 732, configured to compare a route of the actual fulfillment path from a current fulfillment center to a next fulfillment center with a route of the standard planned path from the current fulfillment center to a next fulfillment center;
- a data marking unit 733, configured to mark the current fulfillment center as a mis-distribution center if the two compared routes are different, and instruct the standard planned path data obtaining module 720 to re-obtain data of a standard planned path for subsequent route comparison using the next fulfillment center in the actual fulfillment path as an originating center of a standard planned path;
- the center determination unit 731 being further configured to use the next fulfillment center in the actual fulfillment path as a current fulfillment center; and
- a detailed mis-distribution data obtaining unit 734, configured to obtain the detailed mis-distribution data of the logistics object according to route comparison results.

The apparatus shown in FIG. 8 may be configured to perform the method steps shown in FIG. 4.

Further, the detailed mis-distribution data may include: a tracking number of a logistics object, an originating center, a destination center, an actual fulfillment path, a mis-distribution center, a next fulfillment center of the mis-distribution center, and an operation time in the mis-distribution center.

Figure 9A:
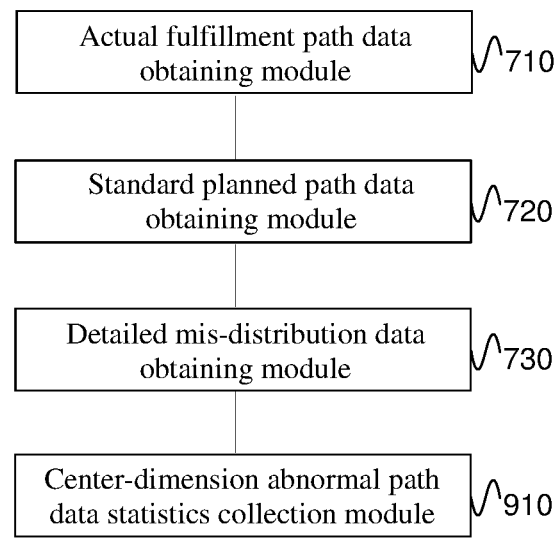
FIG. 9a is a third structural diagram of an abnormal path analysis apparatus, according to an embodiment of the specification.

Further, based on the apparatus shown in FIG. 7, as shown in FIG. 9a, the abnormal path analysis apparatus may further include:

- a center-dimension abnormal path data statistics collection module 910, configured to collect statistics on the detailed mis-distribution data using a distribution center as a dimension of statistics, to obtain data of the abnormal path of a center dimension, the data of the abnormal path of the center dimension including: a current distribution center, a mis-distribution operation date, a total mis-distribution quantity, a total operation quantity, and a mis-distribution ratio.

Figure 9B:
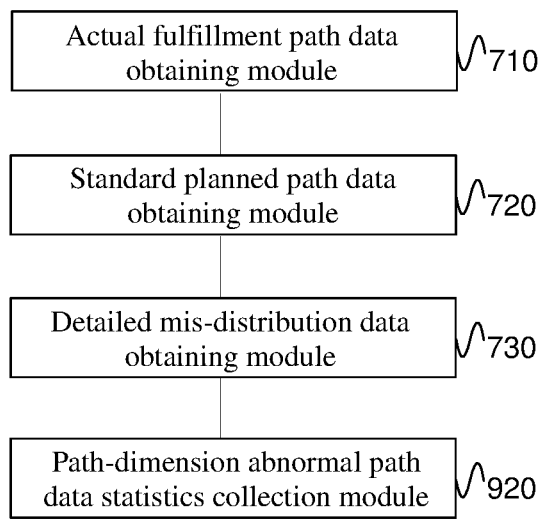
FIG. 9b is a fourth structural diagram of an abnormal path analysis apparatus, according to an embodiment of the specification.

Further, based on the apparatus shown in FIG. 7, as shown in FIG. 9b, the abnormal path analysis apparatus may further include:

- a path-dimension abnormal path data statistics collection module 920, configured to collect statistics on the detailed mis-distribution data using an originating center as a dimension of statistics, to obtain data of the abnormal path of a path dimension, the data of the abnormal path of the path dimension including: an originating center, a destination center, an actual fulfillment path, a total mis-distribution quantity, a total path quantity, and a path mis-distribution ratio.

Figure 9C:
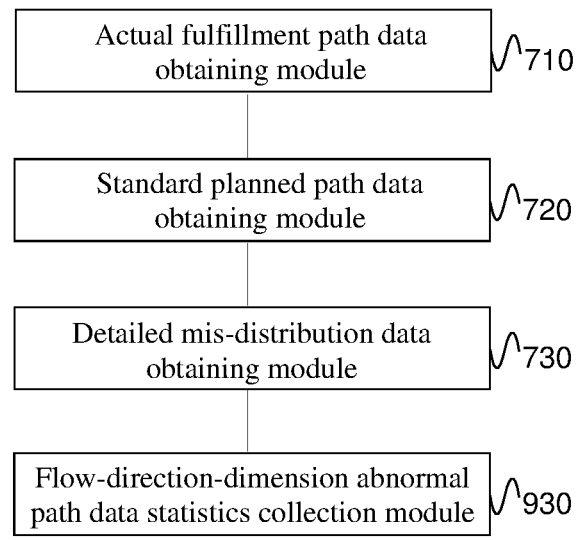
FIG. 9c is a fifth structural diagram of an abnormal path analysis apparatus, according to an embodiment of the specification.

Further, based on the apparatus shown in FIG. 7, as shown in FIG. 9c, the abnormal path analysis apparatus may further include:

- a flow-direction-dimension abnormal path data statistics collection module 930, configured to collect statistics on the detailed mis-distribution data using a flow direction of a logistics object as a dimension of statistics, to obtain data of the abnormal path of a flow direction dimension, the data of the abnormal path of the flow direction dimension including: an originating center, a destination center, a mis-distribution order quantity, a total order quantity, and a flow direction mis-distribution ratio.

The apparatus shown in FIG. 9a, FIG. 9b, and FIG. 9c can be configured to correspondingly perform the method steps shown in FIG. 5a, FIG. 5b, and FIG. 5c.

Figure 10:
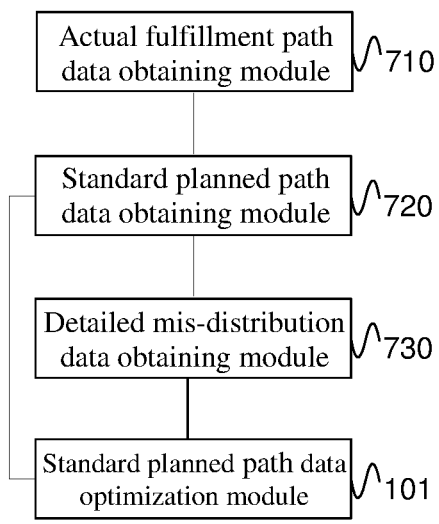
FIG. 10 is a sixth structural diagram of an abnormal path analysis apparatus, according to an embodiment of the specification.

Further, based on the apparatus shown in FIG. 7, as shown in FIG. 10, the abnormal path analysis apparatus may further include:

- a standard planned path data optimization module 101, configured to perform, using the detailed mis-distribution data, path optimization and path supplement on original data of a standard planned path provided by a courier.

The apparatus shown in FIG. 10 may be configured to correspondingly perform the method steps shown in FIG. 6.

The abnormal path analysis apparatus provided in this embodiment of the specification compares the data of the actual fulfillment path of the logistics object with the data of the standard planned path to obtain the detailed mis-distribution data of the logistics object, to accurately evaluate an abnormal path in an express network. In addition, the path data comparison process is not necessarily performed after the logistics object reaches a destination center, and it can be performed as long as part of the fulfillment path data in the actual fulfillment path is obtained. Therefore, an abnormality of an actual fulfillment path of an express delivery vehicle on a path can be monitored and pre-determined in real time.

Further, statistical values of abnormal paths in a plurality of dimensions are obtained by collecting statistics on detailed mis-distribution data of logistics objects in different dimensions. Based on the detailed mis-distribution data, a standard planned path of a logistics object can be calculated upon collection of the logistics object, and every time the logistics object arrives at a distribution center node, calculation can be performed according to the obtained data of an actual fulfillment path to determine whether a path of the logistics object is abnormal, thereby achieving real-time processing.

In addition, the standard planned path database can be updated and maintained every day based on original data of a standard planned path provided by the express company and the statistical values of the abnormal paths in different dimensions, which ensures the accuracy and comprehensiveness of planning data so that an abnormal path is determined more accurately.

Embodiment 4

Figure 11:
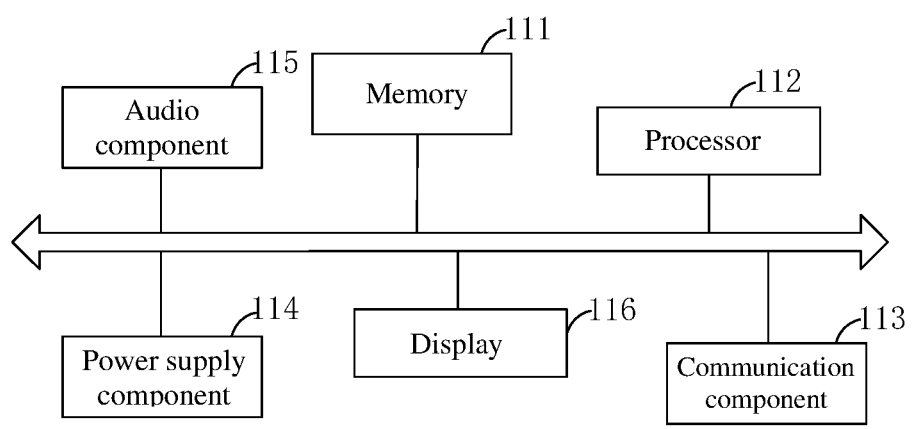
FIG. 11 is a schematic structural diagram of an electronic device, according to an embodiment of the specification.

The foregoing Embodiment 3 describes an overall architecture of the abnormal path analysis apparatus. The function of the apparatus can be implemented by an electronic device. FIG. 11 is a schematic structural diagram of an electronic device, according to an embodiment of the specification. The electronic device includes: a memory 111 and a processor 112.

The memory 111 is configured to store a program.

In addition to the programs, the memory 111 may be further configured to store other data to support operations on the electronic device. Examples of the data include instructions of any application program or method for operations on the electronic device, such as contact data, address book data, a message, a picture, and a video.

The memory 111 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

The processor 112 is coupled to the memory 111 and configured to execute the program in the memory 111. The program includes code instructions for performing the abnormal path analysis method. Correspondingly, based on the code instructions, the processor 112 can perform the abnormal path analysis method, including:

obtaining data of an actual fulfillment path of a logistics object;

obtaining data of a standard planned path corresponding to the logistics object; and comparing the data of the actual fulfillment path of the logistics object with the data of the standard planned path to obtain detailed mis-distribution data of the logistics object.

The foregoing processing operations have been described in detail in the previous embodiments, and will not be repeated herein.

Further, as shown in FIG. 11, the electronic device may further include: a communication component 113, a power supply component 114, an audio component 115, a display 116, and other components. Only some components are schematically shown in FIG. 11, which does not mean that the electronic device includes only the components shown in FIG. 11.

The communication component 113 is configured to facilitate communication between the electronic device and other devices in a wired or wireless manner. The electronic device may access a communication standard-based wireless network, such as Wi-Fi, 2G, 3G, or a combination thereof. In an embodiment, the communication component 113 receives a broadcast signal or broadcast related information from an external broadcast management system via a broadcast channel. In an embodiment, the communication component 113 further includes a near field communication (NFC) module, to promote short-range communication. For example, the NFC module may be implemented based on a radio frequency identification (RFID) technology, an infrared data association (IrDA) technology, an ultra-wideband (UWB) technology, a Bluetooth (BT) technology, and other technologies.

The power supply component 114 provides power for components of the electronic device. The power supply component 114 may include a power supply management system, one or more power supplies, and other components related to generation, management, and allocation of power for the electronic device.

The audio component 115 is configured to output and/or input an audio signal. For example, the audio component 115 includes a microphone (MIC). When the electronic device is in the operating mode, such as a call mode, a record mode, and a speech recognition mode, the microphone is configured to receive an external audio signal. The received audio signal may be further stored in the memory 111 or sent through the communication component 113. In some embodiments, the audio component 115 further includes a speaker, configured to output an audio signal.

The display 116 includes a screen, which may include a liquid crystal display (LCD) and a touch panel (TP). If the screen includes a TP, the screen may be implemented as a touchscreen to receive an input signal from the user. The touch panel includes one or more touch sensors to sense a touch, a slide, and a gesture on the touch panel. The touch sensor may not only sense the boundary of touching or sliding operations, but also detect duration and pressure related to the touching or sliding operations.

A person of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes any medium that can store program code, such as a ROM, a RAM, a magnetic disk, or an optical disc.

Finally, the foregoing embodiments are merely for describing the technical solutions of the specification other than limiting the specification. Although the specification is described in detail with reference to the foregoing embodiments, persons of ordinary skill in the art may make modifications to the technical solutions described in the foregoing embodiments or make equivalent replacements to some or all technical features thereof, without departing from the scope of the technical solutions of the embodiments of the specification.

What is claimed is:

1. An abnormal path analysis method, comprising:
obtaining data of an actual fulfillment path of a logistics object, wherein the actual fulfillment path comprises one or more routes connecting a plurality of fulfillment centers on the actual fulfillment path;
obtaining data of a standard planned path corresponding to the logistics object, wherein the standard planned path comprises one or more routes connecting a plurality of fulfillment centers on the standard planned path;
comparing the data of the actual fulfillment path with the data of the standard planned path to generate route comparison results, wherein the comparing comprises:
setting an originating center of the logistics object as a current fulfillment center; and
executing one or more iterations of step (1) to step (5):
(1) obtaining, from the data of the actual fulfillment path of the logistics object, a route of the actual fulfillment path from the current fulfillment center to a first fulfillment center, wherein the first fulfillment center is a next fulfillment center of the current fulfillment center;
(2) obtaining, from a database storing precomputed standard planned paths, a precomputed route from the current fulfillment center to a second fulfillment center, wherein the second fulfillment center is a precomputed next fulfillment center of the current fulfillment center;
(3) comparing the route of the actual fulfillment path with the precomputed route to obtain a route comparison result and to determine whether the first fulfillment center is different from the second fulfillment center; and
(4) if the first fulfillment center is different from the second fulfillment center, marking the current fulfillment center as a mis-distribution center; and
(5) setting the first fulfillment center in the actual fulfillment path as the current fulfillment center; and
obtaining mis-distribution data of the logistics object according to the route comparison results; and
in response to the route comparison results showing that the actual fulfillment path comprises a shorter distance than the standard planned path, adding the actual fulfillment path to the database, thereby increasing standard planned paths in the database for future abnormal path analysis.

2. The method of claim 1, wherein the mis-distribution data comprises: a tracking number of the logistics object, the originating center, a destination center, the actual fulfillment path, a mis-distribution center, a next fulfillment center following the mis-distribution center, and an operation time of the mis-distribution center.

3. The method of claim 1, wherein the method further comprises:
collecting statistics on the mis-distribution data using a distribution center as a dimension of statistics, to obtain data of an abnormal path with respect to a center dimension, the data of the abnormal path with respect to the center dimension comprising: a current distribution center, a mis-distribution operation date, a total mis-distribution quantity, a total operation quantity, and a mis-distribution ratio.

4. The method of claim 1, wherein the method further comprises:
collecting statistics on the mis-distribution data using the originating center as a dimension of statistics, to obtain data of an abnormal path with respect to a path dimension, the data of the abnormal path with respect to the path dimension comprising: an originating center, a destination center, an actual fulfillment path, a total mis-distribution quantity, a total path quantity, and a path mis-distribution ratio.

5. The method of claim 1, wherein the method further comprises:
collecting statistics on the mis-distribution data using a flow direction of a logistics object as a dimension of statistics, to obtain data of an abnormal path with respect to a flow direction dimension, the data of the abnormal path with respect to the flow direction dimension comprising: an originating center, a destination center, a mis-distribution order quantity, a total order quantity, and a flow direction mis-distribution ratio.

6. The method of claim 1, wherein the method further comprises:
performing path optimization and path supplement on the data of the standard planned path using the mis-distribution data.

7. An abnormal path analysis system, comprising a processor and a non-transitory computer-readable storage medium storing instructions executable by the processor to cause the system to perform operations comprising:
obtaining data of an actual fulfillment path of a logistics object, wherein the actual fulfillment path comprises one or more routes connecting a plurality of fulfillment centers on the actual fulfillment path;
obtaining data of a standard planned path corresponding to the logistics object, wherein the standard planned path comprises one or more routes connecting a plurality of fulfillment centers on the standard planned path;
comparing the data of the actual fulfillment path with the data of the standard planned path to generate route comparison results, wherein the comparing comprises:
setting an originating center of the logistics object as a current fulfillment center; and
executing one or more iterations of step (1) to step (5):
(1) obtaining, from the data of the actual fulfillment path of the logistics object, a route of the actual fulfillment path from the current fulfillment center to a first fulfillment center, wherein the first fulfillment center is a next fulfillment center of the current fulfillment center;
(2) obtaining, from a database storing precomputed standard planned paths, a precomputed route from the current fulfillment center to a second fulfillment center, wherein the second fulfillment center is a precomputed next fulfillment center of the current fulfillment center;
(3) comparing the route of the actual fulfillment path with the precomputed route to obtain a route comparison result and to determine whether the first fulfillment center is different from the second fulfillment center; and
(4) if the first fulfillment center is different from the second fulfillment center, marking the current fulfillment center as a mis-distribution center; and
(5) setting the first fulfillment center in the actual fulfillment path as the current fulfillment center; and
obtaining mis-distribution data of the logistics object according to the route comparison results; and
in response to the route comparison results showing that the actual fulfillment path comprises a shorter distance than the standard planned path, adding the actual fulfillment path to the database, thereby increasing standard planned paths in the database for future abnormal path analysis.

8. The system of claim 7, wherein the mis-distribution data comprises: a tracking number of the logistics object, the originating center, a destination center, the actual fulfillment path, a mis-distribution center, a next fulfillment center following the mis-distribution center, and an operation time of the mis-distribution center.

9. The system of claim 7, wherein the operations further comprise:
collecting statistics on the mis-distribution data using a distribution center as a dimension of statistics, to obtain data of an abnormal path with respect to a center dimension, the data of the abnormal path with respect to the center dimension comprising: a current distribution center, a mis-distribution operation date, a total mis-distribution quantity, a total operation quantity, and a mis-distribution ratio.

10. The system of claim 7, wherein the operations further comprise:
collecting statistics on the mis-distribution data using the originating center as a dimension of statistics, to obtain data of an abnormal path with respect to a path dimension, the data of the abnormal path with respect to the path dimension comprising: an originating center, a destination center, an actual fulfillment path, a total mis-distribution quantity, a total path quantity, and a path mis-distribution ratio.

11. The system of claim 7, wherein the operations further comprise:
collecting statistics on the mis-distribution data using a flow direction of a logistics object as a dimension of statistics, to obtain data of an abnormal path with respect to a flow direction dimension, the data of the abnormal path with respect to the flow direction dimension comprising: an originating center, a destination center, a mis-distribution order quantity, a total order quantity, and a flow direction mis-distribution ratio.

12. The system of claim 7, wherein the operations further comprise:

performing path optimization and path supplement on the data of the standard planned path using the mis-distribution data.

13. A non-transitory computer-readable storage medium for an abnormal path analysis, configured with instructions executable by one or more processors to cause the one or more processors to perform operations comprising:
   obtaining data of an actual fulfillment path of a logistics object, wherein the actual fulfillment path comprises one or more routes connecting a plurality of fulfillment centers on the actual fulfillment path;
   obtaining data of a standard planned path corresponding to the logistics object, wherein the standard planned path comprises one or more routes connecting a plurality of fulfillment centers on the standard planned path;
   comparing the data of the actual fulfillment path with the data of the standard planned path to generate route comparison results, wherein the comparing comprises:
      setting an originating center of the logistics object as a current fulfillment center; and
      executing one or more iterations of step (1) to step (5):
         (1) obtaining, from the data of the actual fulfillment path of the logistics object, a route of the actual fulfillment path from the current fulfillment center to a first fulfillment center, wherein the first fulfillment center is a next fulfillment center of the current fulfillment center;
         (2) obtaining, from a database storing precomputed standard planned paths, a precomputed route from the current fulfillment center to a second fulfillment center, wherein the second fulfillment center is a precomputed next fulfillment center of the current fulfillment center;
         (3) comparing the route of the actual fulfillment path with the precomputed route to obtain a route comparison result and to determine whether the first fulfillment center is different from the second fulfillment center; and
         (4) if the first fulfillment center is different from the second fulfillment center, marking the current fulfillment center as a mis-distribution center; and
         (5) setting the first fulfillment center in the actual fulfillment path as the current fulfillment center; and
   obtaining mis-distribution data of the logistics object according to the route comparison results; and
   in response to the route comparison results showing that the actual fulfillment path comprises a shorter distance than the standard planned path, adding the actual fulfillment path to the database, thereby increasing standard planned paths in the database for future abnormal path analysis.

14. The medium of claim 13, wherein the mis-distribution data comprises: a tracking number of the logistics object, the originating center, a destination center, the actual fulfillment path, a mis-distribution center, a next fulfillment center following the mis-distribution center, and an operation time of the mis-distribution center.

15. The medium of claim 13, wherein the operations further comprise:
   collecting statistics on the mis-distribution data using a distribution center as a dimension of statistics, to obtain data of an abnormal path with respect to a center dimension, the data of the abnormal path with respect to the center dimension comprising: a current distribution center, a mis-distribution operation date, a total mis-distribution quantity, a total operation quantity, and a mis-distribution ratio.

16. The medium of claim 13, wherein the operations further comprise:
   collecting statistics on the mis-distribution data using the originating center as a dimension of statistics, to obtain data of an abnormal path with respect to a path dimension, the data of the abnormal path with respect to the path dimension comprising: an originating center, a destination center, an actual fulfillment path, a total mis-distribution quantity, a total path quantity, and a path mis-distribution ratio.

17. The medium of claim 13, wherein the operations further comprise:
   collecting statistics on the mis-distribution data using a flow direction of a logistics object as a dimension of statistics, to obtain data of an abnormal path with respect to a flow direction dimension, the data of the abnormal path with respect to the flow direction dimension comprising: an originating center, a destination center, a mis-distribution order quantity, a total order quantity, and a flow direction mis-distribution ratio.

* * * * *